Sept. 18, 1934.  L. SHIELDS ET AL  1,974,085
GROWTH INDICATING CHART
Filed June 23, 1931
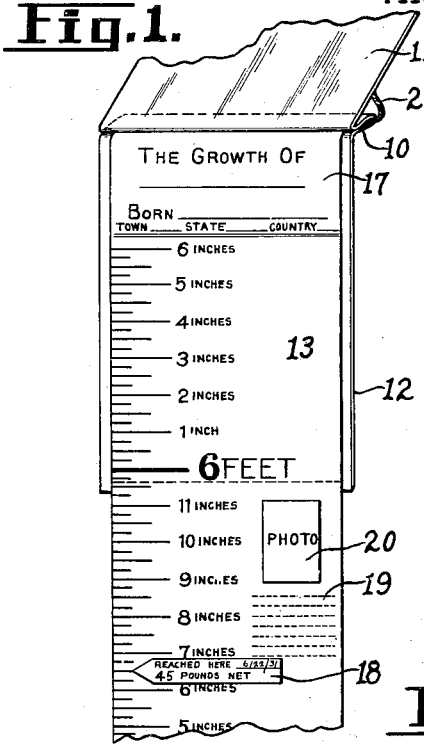
Fig. 1.
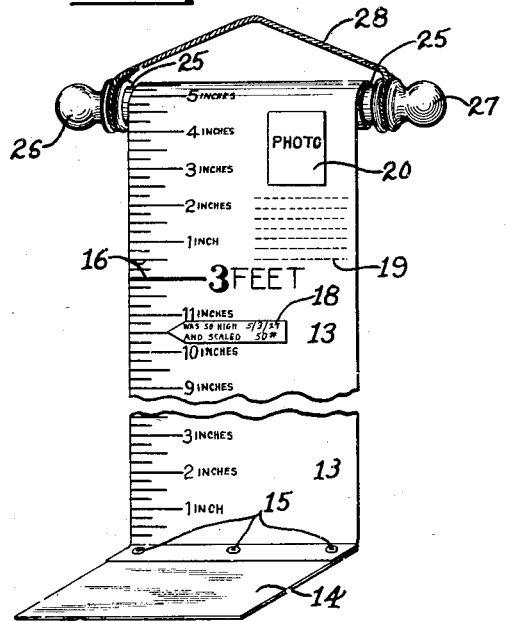
Fig. 3.
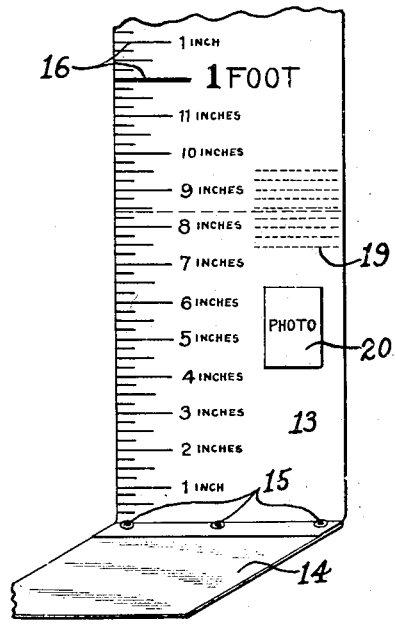
Fig. 2.
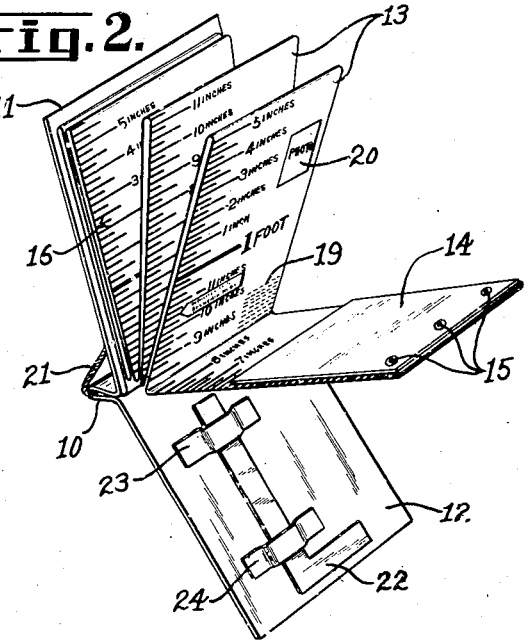
INVENTORS
Lavelle Shields
David O. Anderson.
BY THEIR ATTORNEY
H. G. Manning Patented Sept. 18, 1934

1,974,085

UNITED STATES PATENT OFFICE 1,974,085

GROWTH INDICATING CHART

Lavelle Shields and David O. Anderson, Waterbury, Conn.

Application June 23, 1931, Serial No. 546,281

1 Claim. (Cl. 33—169)

This invention relates to record charts, and more particularly to a chart for measuring and recording the height of children, adults, plants, domestic animals or other objects.

One object of this invention is to provide a chart of the above nature on which the exact height of the child or other object may be measured from time to time and recorded, said chart being adapted to be folded into a compact form for future reference.

A further object is to provide a chart of the above nature upon which stickers or labels may be pasted to permanently indicate the height and weight of a child at various periods in its life. If desired, additional items of interest pertaining to the individual, such as photographs, newspaper clippings, etc., may be attached to the chart.

A further object is to provide a growth indicating chart which may be very easily kept up to date without arduous effort, A further object is to provide a record chart of the above nature which will be especially useful for doctors, baby welfare stations and clinics, schools, and in the home for keeping a graphic history of an individual.

A further object is to provide a chart of the above nature which will be simple in construction, inexpensive to manufacture, easy to manipulate, compact, ornamental in appearance, and very efficient and durable in use.

With these and other objects in view there have been illustrated on the accompanying drawing, two forms in which the invention may be conveniently embodied in practice.

In the drawing:

Fig. 1 represents a fragmentary perspective view of the preferred form of chart embodying the invention shown in open position.

Fig. 2 is a perspective view showing the same as it appears when partly folded up into booklet form.

Fig. 3 is a fragmentary perspective view of a modified form of the chart which is adapted to be wound up on a roller.

Referring now to the drawing in which like reference numerals denote corresponding parts throughout the several views, the numeral 10 indicates a cover for the first form of chart, comprising a front plate 11 and a rear plate 12. A foldable chart 13 is suitably bound at its upper end within the looped end of the cover 10, and is provided at its lower end with a stiff end flap 14 upon which the individual being measured is adapted to stand. The flap 14 is securely attached to the lower end of said chart 13, as by a plurality of eyelets 15.

The left-hand edge of said chart 13, as viewed in Fig. 1, is provided with a standard linear scale 16 graduated in feet and inches, said scale preferably extending to six and a half feet. A section 17 is provided at the head or top of the chart for indicia indicating the nature of the chart herein shown as "The Growth of ———". Spaces are provided below upon which may be recorded the name, date of birth, town, state and country of residence of the individual.

Supplied with a growth chart are a number of labels 18 herein shown rectangular in shape, and provided with pointed outer ends. The labels 18 may have printed thereon "Quaint" statements or "Catchy" phrases indicating the data to be written thereon, such as "Reached here", "Was so high", "Pounds net", "and Scaled", etc. Each label 18 when filled out is to be pasted upon the growth chart 13 with its pointed end adjacent the position on the scale indicating the height of the individual upon the date when the label was filled out.

In order to receive other items of interest, the right-hand side of the chart 13 has a plurality of sections 19. Provision is also made of a number of outlined blank sections 20 upon which photographs may be attached, this feature greatly adding to the interest and value of the chart.

A suitable cord 21 is passed through the upper looped end of the cover 10 for convenience in hanging the chart upon a wall, if so desired. A right-angle square 22 may also be supplied with the chart to be used when measuring heights. When the square 22 is not in use, it may be detachably secured to the inside of the rear cover plate 12 in any suitable manner, as by means of a pair of cross-strips 23 and 24 having their ends pasted to said cover plate 12, as clearly shown in Fig. 2.

In the modified form of the invention shown in Fig. 3, the chart employed is identical with that of the preferred form, but instead of being folded up as in Figs. 1 and 2, it is wound upon a roller 25. The roller 25 carries at its ends a pair of handle knobs 26 and 27 for convenience in manipulation of said roller 25, said knobs having a suspension cord 28 suitably attached thereto so that said chart 13 may be readily hung upon a wall, if so desired.

It will be understood that, if desired, the use of labels to record the height of the object may be dispensed with, and that the periodically measured heights may be directly written on the chart opposite the proper scale indications.

*Operation*

In operation, when it is desired to measure the height of a child or other object, the chart 13 will be hung upon a wall by means of the attached cord 21 (or 28) so that the end flap 14 will rest flat upon the floor. The object to be measured will then be placed upon said end flap 14 (in the case of a child, with its back to the chart). The exact height of the child may be then determined by sliding the square 22 down the linear scale 16 upon the chart until the horizontal arm of the square rests upon the top of the child's head. A label 18, with its pointed end in alinement with the corresponding line on the height scale, will then be pasted upon the chart 13. The date and the weight of said child will then be written on the label, as shown.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a growth indicating chart, an elongated vertical strip having a scale extending along its length, a stiff horizontal flap attached to said strip at the bottom end of said scale for receiving the object to be measured, and means to which the upper end of said strip is attached for hanging said chart upon a wall with the flap resting flat on the floor.

LAVELLE SHIELDS.
DAVID O. ANDERSON.